(12) United States Patent
Kouno et al.

(10) Patent No.: US 9,440,407 B2
(45) Date of Patent: Sep. 13, 2016

(54) TIRE AND TIRE MANUFACTURING METHOD

(75) Inventors: Yoshihide Kouno, Kunitachi (JP); Seiji Kon, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 70 days.

(21) Appl. No.: 13/201,734

(22) PCT Filed: Feb. 17, 2010

(86) PCT No.: PCT/JP2010/052360
§ 371 (c)(1),
(2), (4) Date: Aug. 16, 2011

(87) PCT Pub. No.: WO2010/095654
PCT Pub. Date: Aug. 26, 2010

(65) Prior Publication Data
US 2011/0297289 A1    Dec. 8, 2011

(30) Foreign Application Priority Data

Feb. 17, 2009    (JP) .................................. 2009-034104

(51) Int. Cl.
*B60C 5/01*    (2006.01)
*B60C 9/22*    (2006.01)
(Continued)

(52) U.S. Cl.
CPC ........... *B29D 30/1628* (2013.01); *B29D 30/08* (2013.01); *B29D 30/28* (2013.01); *B29D 30/3028* (2013.01); *B29D 30/38* (2013.01);
(Continued)

(58) Field of Classification Search
CPC ........... B60C 5/007; B60C 5/01; B60C 5/18; B60C 9/22; B60C 2009/2209; B60C 9/2204; B60C 2015/0614; B29D 30/08; B29D 30/0678; B29D 30/0679; B29D 2030/084; B29D 2030/086; B29D 30/06; Y10T 152/10819
USPC ...... 152/452, 531, 343.1, 344.1, 345.1, 543; 156/125
See application file for complete search history.

(56) References Cited

U.S. PATENT DOCUMENTS 3,712,362 A * 1/1973 Alderfer ..................... 152/452
RE28,424 E * 5/1975 McGillvary .................. 152/452
(Continued)

FOREIGN PATENT DOCUMENTS

DE     2940580 A1    4/1981
EP     0 006 425 A1  1/1980
(Continued)

OTHER PUBLICATIONS

English abstract of French Patent Application 2 429 111 A, Feb. 22, 1980.*
(Continued)

*Primary Examiner* — Adrienne C Johnstone
(74) *Attorney, Agent, or Firm* — Sughrue Mion, PLLC

(57) ABSTRACT

A tire includes a ring shaped tire case formed from a resin material, a reinforcement cord having a higher rigidity that that of the resin material, wound in a spiral shape on the outer peripheral section of the tire case and having at least a portion of the reinforcement cord embedded in and making close contact with the outer peripheral section of the tire case when viewed in a cross-section along the axial direction of the tire case and a tread provided on the radial direction outside of a reinforcement cord layer formed by the reinforcement cord.

4 Claims, 10 Drawing Sheets

(51) Int. Cl.

| | | |
|---|---|---|
| *B60C 15/06* | (2006.01) | |
| *B29D 30/08* | (2006.01) | |
| *B29D 30/16* | (2006.01) | |
| *B60C 5/00* | (2006.01) | |
| *B60C 5/18* | (2006.01) | |
| *B29D 30/28* | (2006.01) | |
| *B29D 30/30* | (2006.01) | |
| *B29D 30/38* | (2006.01) | |
| *B29D 30/56* | (2006.01) | |
| *B29D 30/06* | (2006.01) | |

(52) U.S. Cl.
CPC ........... *B29D 30/56* (2013.01); *B60C 5/007* (2013.01); *B60C 5/01* (2013.01); *B60C 5/18* (2013.01); *B60C 9/22* (2013.01); *B60C 9/2204* (2013.04); *B29D 2030/086* (2013.01); *B29D 2030/1678* (2013.01); *B29D 2030/383* (2013.01); *B60C 2009/2209* (2013.04); *B60C 2015/0614* (2013.04); *Y10T 152/10495* (2015.01); *Y10T 152/10819* (2015.01)

(56) References Cited

U.S. PATENT DOCUMENTS

| | | | | |
|---|---|---|---|---|
| 4,257,836 | A * | 3/1981 | Beneze | 156/125 |
| 4,312,394 | A | 1/1982 | Thorns et al. | |
| 4,401,502 | A * | 8/1983 | Schmidt | 152/452 X |
| 5,032,198 | A * | 7/1991 | Kojima et al. | 152/531 X |
| 6,425,426 | B1 * | 7/2002 | Osborne et al. | 152/531 X |
| 6,460,585 | B1 * | 10/2002 | Osborne et al. | 152/531 X |
| 2006/0076099 | A1 | 4/2006 | Kuo | |

FOREIGN PATENT DOCUMENTS

| | | |
|---|---|---|
| FR | 2429111 A1 | 1/1980 |
| FR | 2432945 A1 | 3/1980 |
| JP | S51136761 A | 11/1976 |
| JP | 54-162307 A | 12/1979 |
| JP | S572745 A | 1/1982 |
| JP | 57-137505 U | 8/1982 |
| JP | 59034904 A | 2/1984 |
| JP | 61-257304 A | 11/1986 |
| JP | 3-143701 A | 6/1991 |
| JP | 5-116504 A | 5/1993 |
| JP | 2008-201336 A | 9/2008 |
| JP | 2008-290609 A | 12/2008 |

OTHER PUBLICATIONS

"Urethane Polymers", Kirk-Othmer Encyclopedia of Chemical Technology, vol. 25, John Wiley & Sons, Inc., published online Jun. 16, 2006, pp. 1-35.*
Random House Kernerman Webster's College Dictionary, Random House, Inc., 2005, online definition of "thermoplastic".*
European Search Report dated Jul. 10, 2012 issued in European Application No. 10743780.8.
International Search Report for PCT/JP2010/052360 dated May 18, 2010.
Korean Office Action issued in Korean Application No. 10-2011-7021121 dated Feb. 21, 2013, English translation.
Chinese Office Action issued in Chinese Application No. 201080008040.0 dated Mar. 21, 2013, Partial English translation.
Japanese Office Action dated Jan. 7, 2014, issued in Japanese Patent Application No. 2011-500631.
Communication dated Oct. 13, 2015 from the Japanese Patent Office issued in corresponding Application No. 2014-234408.

* cited by examiner

TIRE AND TIRE MANUFACTURING METHOD

CROSS REFERENCE TO RELATED APPLICATIONS

This application is a National Stage of International Application No. PCT/JP2010/052360 filed on Feb. 17, 2010, which claims priority from Japanese Patent Application No. 2009-034104, filed on Feb. 17, 2009, the contents of all of which are incorporated herein by reference in their entirety.

TECHNICAL FIELD

The present invention relates to a tire for rim mounting and tire manufacturing method, and in particular to a tire and tire manufacturing method in which at least a portion of the tire is formed from a resin material, and in particular a thermoplastic material.

BACKGROUND ART

Pneumatic tires configured with rubber, organic fiber material, and steel members are traditionally employed on vehicles such as cars.

However, there is a limit to application of post-use recycling of rubber, and disposal is performed by such processes as combustion and shredding for use as pavement materials for roads.

There is demand recently to use materials such as resin materials, thermoplastic resins and thermoplastic elastomers as tire materials due to their advantages from the perspectives of weight reduction, ease of formability, and ease of recycling.

For example, a pneumatic tire formed using a thermoplastic polymer material is described in Patent Document 1.
Patent Document 1: Japanese Patent Application Laid-Open No. 03-143701.

DISCLOSURE OF INVENTION

Technical Problem

Tires employing thermoplastic polymer materials are easier to manufacture and lower in cost than conventional rubber tires. However, when a tire frame body is formed from a uniform thermoplastic polymer material without internal installation of a reinforcement member, such as a carcass ply, the tire is inferior to a conventional rubber tire from perspectives such as force withstanding ability and internal pressure withstanding ability. Accordingly, in Patent Document 1 the tire radial direction outside face of a tread bottom section of a tire body (tire frame body) is provided with a reinforcement layer of a reinforcement cord continuously wound in a spiral shape along the tire circular circumferential direction, thereby improving cut withstanding properties and puncture resisting ability.

However when a reinforcement layer is formed by directly spirally winding a reinforcement cord on a tire frame body formed from a thermoplastic polymer material and a tread is formed at the radial direction outside of the reinforcement layer, even when an adhesive is used on the reinforcement cord it cannot be said that there is sufficient adhesion achieved, air is retained in the periphery of the reinforcement cord, and there is concern of a reduction in durability of the tire due to the reinforcement cord moving during running and delamination occurring between members.

The present invention is made to address the above issues and is directed towards providing a tire formed from a resin material, and in particular a thermoplastic material, that also suppresses introduction of air and has enhanced durability, and to a tire manufacturing method of the same.

Solution to Problem

A first aspect of the present invention is a tire for rim mounting comprising a ring shaped tire frame body formed from a resin material, the tire comprising a reinforcement cord member wound around an outer peripheral section of the tire frame body to form a reinforcement cord layer and, when viewed in a cross-section along the axial direction of the tire frame body, having at least a portion of the reinforcement cord member embedded in the outer peripheral section of the tire frame body.

In the first aspect of the present invention, puncture resistance, resistance to cuts and circumferential direction rigidity of the tire (the tire frame body) are raised since the outer peripheral section of the tire frame body formed from the resin material is configured with the reinforcement cord layer of the wound reinforcement cord member. By raising the circumferential direction rigidity, creep (a phenomenon in which plastic deformation of a tire frame body under application of a fixed force increases with time) of the tire frame body formed from the resin material is suppressed.

Furthermore, incorporation of air is suppressed, and movement of the reinforcement cord member due to force input during running is suppressed since, when viewed in a cross-section along the axial direction of the tire frame body, at least a portion of the reinforcement cord member is embedded in the outer peripheral section of the tire frame body formed from the resin material. Accordingly, when, for example, the tire building members are provided so as to cover the entire reinforcement cord member on the outer peripheral section of the tire frame body, delamination is suppressed from occurring between these members (including the tire frame body) due to suppressing movement of the reinforcement cord member, thereby raising durability.

Furthermore, since the reinforcement cord member is wound on the outer peripheral section of the tire frame body the rigidity to internal air pressure acting from the radial direction inside is raised.

A second aspect of the present invention is the tire of the first aspect, further comprising a tread provided at the radial direction outside of the reinforcement cord layer and formed from a material having better abrasion resistance characteristics than the resin material.

In the second aspect of the present invention, the abrasion resistance characteristics are raised since the tread that makes road surface contact is configured from a material having better abrasion resistance characteristics than that of the resin material.

A third aspect of the present invention is the tire of the first aspect, wherein, viewed in a cross-section along the axial direction of the tire frame body, the reinforcement cord member is embedded in the outer peripheral section of the tire frame body by $1/5$ of the diameter of the reinforcement cord member or greater.

In the third aspect of the present invention, air incorporation is efficiently suppressed, and movement of the reinforcement cord member due to force input during running is suppressed since the reinforcement cord member is embedded in the outer peripheral section of the tire frame body by ⅕ of the diameter of the reinforcement cord member or greater when viewed in a cross-section along the axial direction of the tire frame body.

A fourth aspect of the present invention is the tire of the invention of any one of claim 1 to claim 3, wherein the tire frame body comprises, at the radial direction inside, a bead section that makes contact with a bead seat and a rim flange of the rim, and a ring shaped bead core made from a metal material embedded in the bead section.

In the fourth aspect of the present invention, since the tire frame body includes the bead section at a location that fits to the rim, and the ring shaped bead core made from a metal material is also embedded in the bead section, the tire frame body, namely the tire, is retained on the rim with a similar robustness that of a conventional rubber pneumatic tire.

A fifth aspect of the present invention is the tire of the fourth aspect, further comprising a seal portion that is provided to a portion of the bead section making contact with the rim and is formed from a material that is softer than the resin material.

In the fifth aspect of the present invention, the sealing ability (air tightness) between the tire (the tire frame body) and the rim is raised since the seal portion is provided to the portion making contact with the rim and is formed from a material that is softer than the resin material. Air can accordingly be suppressed from leaking out from inside the tire better than when sealing is between the rim and the resin material. Rim fit-ability is also raised by providing the sealing portion.

A sixth aspect of the present invention is the tire of the first aspect, wherein the resin material has thermoplastic properties.

In the sixth aspect of the present invention, due to the resin material having thermoplastic properties tire manufacture is easier than when the resin material has thermoset properties.

A seventh aspect of the present invention is a tire manufacturing method comprising a cord member winding process of winding a reinforcement cord member onto an outer peripheral section of a ring shaped tire frame body formed from a thermoplastic material, and embedding at least a portion of the reinforcement cord member in the outer peripheral section while melting or softening the outer peripheral section.

In the seventh aspect of the present invention, at least the embedded portion of the reinforcement cord member and the melted or softened thermoplastic material adhere (cohere) since at least a portion of the reinforcement cord member is embedded in the outer peripheral section of the tire frame body formed from the thermoplastic material while melting or softening the outer peripheral section. Accordingly, viewed in a cross-section along the axial direction of the tire frame body, air is suppressed from being incorporated between the outer peripheral section of the tire frame body and the reinforcement cord member. Furthermore, after a certain period of time has elapsed and the embedded portion of the reinforcement cord member has cooled and hardened, the embedded reinforcement cord member becomes difficult to remove.

An eighth aspect of the present invention is the tire manufacturing method of the seventh aspect, wherein, in the cord member winding process the reinforcement cord member viewed in a cross-section along the axial direction of the tire frame body is embedded in the outer peripheral section of the tire frame body by ⅕ of the diameter of the reinforcement cord member or greater.

In the eighth aspect of the present invention, air is efficiently suppressed from being incorporated during manufacture since the reinforcement cord member viewed in a cross-section along the axial direction of the tire frame body is embedded in the outer peripheral section of the tire frame body by ⅕ of the diameter of the reinforcement cord member or greater. The embedded reinforcement cord member also becomes even more difficult to remove.

A ninth aspect of the present invention is the tire manufacturing method of the seventh aspect, wherein the reinforcement cord member is heated in the cord member winding process.

In the ninth aspect of the present invention, the contact portions making contact with the heated reinforcement cord member at the outer peripheral section of the tire frame body are melted or softened due to the reinforcement cord member being heated, thereby facilitating embedding of the reinforcement cord member in the outer peripheral section of the tire frame body.

A tenth aspect of the present invention is the tire manufacturing method of the seventh aspect, wherein, in the cord member winding process, the portion of the outer peripheral section of the tire frame body where the reinforcement cord member is to be embedded is heated.

In the tenth aspect of the present invention, the heated portion melts or softens due to the portion of the outer peripheral section of the tire frame body where the reinforcement cord member is to be embedded being heated, thereby facilitating embedding of the reinforcement cord member.

An eleventh aspect of the present invention is the tire manufacturing method of the seventh aspect, wherein, in the cord member winding process, the reinforcement cord member is wound in a spiral shape on the outer peripheral section of the tire frame body while regulating tension of the reinforcement cord member to a predetermined value.

In the eleventh aspect of the present invention, the embedded amount of the reinforcement cord member in the outer peripheral section of the tire frame body can be regulated, and winding can be performed while suppressing snaking of the reinforcement cord member on the outer peripheral section of the tire frame body due to the reinforcement cord member being wound in a spiral shape on the outer peripheral section of the tire frame body while regulating tension of the reinforcement cord member to a predetermined value.

An twelfth aspect of the present invention is the tire manufacturing method of the seventh aspect, wherein, in the cord member winding process, the reinforcement cord member is wound in a spiral shape while pressing the reinforcement cord member against the outer peripheral section of the tire frame body.

In the twelfth aspect of the present invention, the embedded amount of the reinforcement cord member in the outer peripheral section of the tire frame body can be regulated due to the reinforcement cord member being wound in a spiral shape while pressing the reinforcement cord member against the outer peripheral section of the tire frame body.

An thirteenth aspect of the present invention is the tire manufacturing method of the seventh aspect, wherein, in the cord member winding process, the melted or softened portion of the outer peripheral section of the tire frame body is force cooled after the reinforcement cord member has been embedded.

In the thirteenth aspect of the present invention, the melted or softened portion of the outer peripheral section of the tire frame body is swiftly cooled and hardened due to the melted or softened portion of the outer peripheral section of the tire frame body being force cooled after the reinforcement cord member has been embedded. Namely, since cooling is quicker than with unforced cooling, deformation of the outer peripheral section of the tire frame body is suppressed and movement of the reinforcement cord member is suppressed.

Advantageous Effects of Invention

Configuring the tire of the present invention as explained above suppresses air from being incorporated and raises durability. The tire manufacturing method of the present invention can suppress air incorporation and manufacture a tire with raised durability.

BEST MODE FOR CARRYING OUT THE INVENTION

First Exemplary Embodiment

Explanation follows regarding a tire according to a first exemplary embodiment of the tire of the present invention, with reference to the drawings.

Figure 1A:
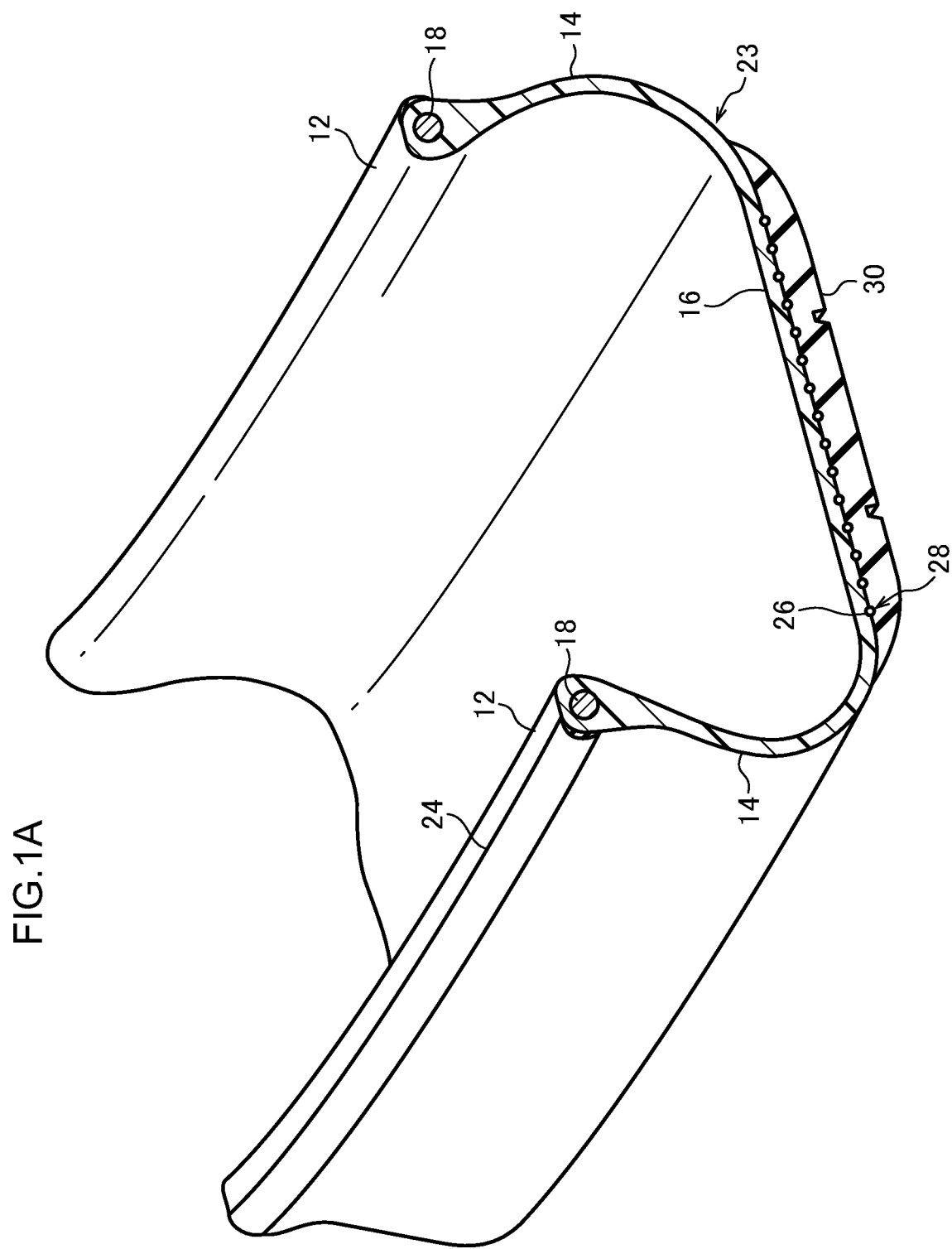
FIG. 1A is a cross-section illustrating a cross-section along a tire rotation axis of a tire of a first exemplary embodiment.

As shown in FIG. 1A, a tire 10 of the present exemplary embodiment displays a substantially similar cross-section profile to that of an ordinary conventional rubber pneumatic tire.

As shown in FIG. 1A, the tire 10 is equipped with a ring shaped tire case 23 (an example of a tire frame body) configured from: a pair of bead sections 12 (see FIG. 1B) that make contact with a bead seat section 21 and a rim flange 22 of a rim 20; side sections 14 that extend from the bead sections 12 towards the tire radial direction outside; and a crown section 16 (outer peripheral section) that connects together the tire radial direction outside edge of one of the side sections 14 and the tire radial direction outside edge of the other of the side sections 14.

The tire case 23 of the present exemplary embodiment is formed from a single resin material, however the present invention is not limited to such a configuration, and resin materials having different characteristics for each location of the tire case 23 (such as the side sections 14, the crown section 16 and the bead sections 12) may be employed similarly to in an ordinary conventional rubber pneumatic tire.

Examples of materials that can be employed as the resin material include materials such as thermoset resins, thermoplastic resins and thermoplastic elastomers (TPE) having resilience similar to that of rubber.

Examples of thermoplastic resins include, for example, urethane resins, olefin resins, vinyl chloride resins and polyamide resins.

Examples of thermoset resins include, for example, phenol resins, urea resins, melamine resins, epoxy resins, and polyester resins.

Examples of such thermoplastic elastomers include, for example, amide thermoplastic elastomers (TPA), ester thermoplastic elastomers (TPC), olefin thermoplastic elastomers (TPO), styrene thermoplastic elastomers (TPS), urethane thermoplastic elastomers (TPU), thermoplastic cross-linked rubber (TPV) or other thermoplastic elastomers (TPZ), as defined in JIS K6418.

A thermoplastic elastomer is preferably employed as the resin material in consideration of such factors as resilience required during running and formability during manufacturing.

A circular ring shaped bead core 18 formed from a steel cord is embedded in each of the bead sections 12 of the present exemplary embodiment, similarly to as in an ordinary conventional pneumatic tire. However the present invention is not limited so such a configuration and the bead core 18 may be omitted as long as sufficient rigidity of the bead sections 12 is achieved and no problems arise in fitting to the rim 20. The bead core 18 is not limited to a steel cord, and may be configured with a cord from a material other than steel, such as an organic fiber cord.

Figure 1B:
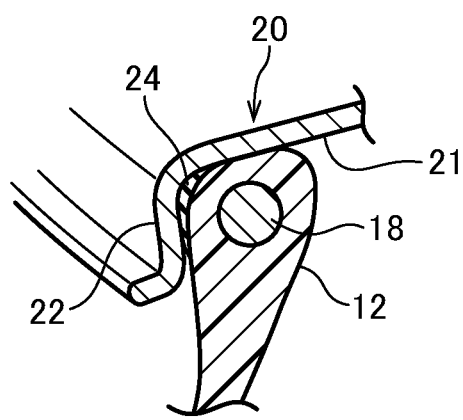
FIG. 1B an enlarged cross-section illustrating a cross-section along a tire rotation axis of a bead section of a tire of the first exemplary embodiment in a fitted state to a rim.

In the present exemplary embodiment, as shown in FIG. 1B, the contact portion of the bead sections 12 to the rim 20, at least the portion that makes contact with the rim flange 22 of the rim 20, is formed from a circular ring shaped seal layer 24 (an example of a seal portion) formed from a softer material than the resin material. The seal layer 24 may also be formed at the portion that makes contact with the bead seat 21.

Preferably a rubber is used as an example of a resilient body for the above soft material for forming the seal layer 24, and in particular a similar type of rubber to that employed on the bead portion outer face of an ordinary conventional rubber pneumatic tire. The rubber seal layer 24 may be omitted as long as sealing ability can be secured to the rim 20 by the resin material alone. Configuration may also be made employing another type of resin material that is softer than the resin material forming the tire case 23.

As shown in FIG. 1A and FIG. 1B, a reinforcement cord layer 28 (shown by intermittent lines in FIG. 2), made from spirally wound reinforcement cord 26 of higher rigidity than the resin material forming the tire case 23 at least partially embedded in the crown section 16 when viewed in cross-section along the axial direction of the tire case 23. The reinforcement cord 26 is in a close contact state with the resin material at the embedded portions. Furthermore, a mono-filament (single fiber) such as a metal fiber or organic fiber, or a twisted multifilament (twisted fiber) such as twisted configurations of such fibers, may be employed as the reinforcement cord 26. The reinforcement cord 26 of the present exemplary embodiment is a twisted steel cord of steel fibers. The embedded amount L of the reinforcement cord 26 is preferably ⅕ or more of the diameter D of the reinforcement cord 26, and more preferably more than ½. It is most preferable for the whole of the reinforcement cord 26 to be embedded in the crown section 16. When the embedded amount L of the reinforcement cord 26 exceeds ½ its diameter D, the reinforcement cord 26 becomes less likely to come out from the embedded portions due to geometrical dimensions. When the whole of the reinforcement cord 26 is embedded in the crown section 16 the surface (outer peripheral face) becomes flat, making it less likely that air is incorporated when members are laid down above. The crown reinforcement layer 28 serves the role equivalent to that of a belt disposed at the outer peripheral face of the carcass in a conventional rubber pneumatic tire.

A tread 30 is disposed at the tire radial direction outer peripheral side of the reinforcement cord layer 28, with the tread 30 configured from a material with superior abrasion resistance characteristics that the resin material forming the tire case 23, formed for example from rubber. Preferably a similar type of rubber to the rubber employed in a conventional rubber pneumatic tire is employed as the rubber used in the tread 30. Instead of the tread 30, configuration may be made with a tread formed from another type of resin material with superior abrasion resistance characteristics to those of the resin material forming the tire case 23. The tread 30 is formed with a tread pattern configured with plural grooves in the road surface contact face, similarly to in a conventional rubber pneumatic tire.

In the present exemplary embodiment the tire case 23 is formed from a thermoplastic material (for example a thermoplastic resin or a thermoplastic elastomer) as an example of the resin material.

Tire Manufacturing Apparatus

Explanation follows regarding a manufacturing apparatus for the tire 10 of the present exemplary embodiment.

FIG. 3 are perspective views of relevant portions of a tire supporting section 34 building machine 32 employed when forming the tire 10.

The building machine 32 has a shaft 36 and a geared motor (not shown in the drawings) for rotating a horizontally disposed shaft 36. The tire supporting section 34 for supporting the tire case 23 is provided on the end side of the shaft 36.

The tire supporting section 34 is equipped with a cylinder block 38 fixed to the shaft 36, and with plural cylinder rods 40 provided at even spacings around the circumferential direction of the cylinder block 38 and extending towards the radial direction outside.

Figure 3A:
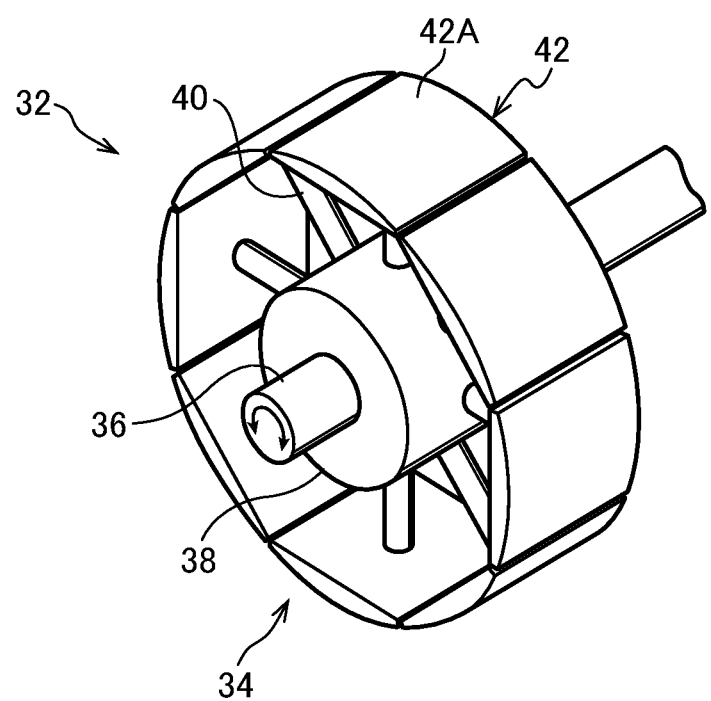
FIG. 3A is a perspective view of a tire supporting section of a tire building machine with cylinder rods in the minimum protruding amount state.
Figure 3B:
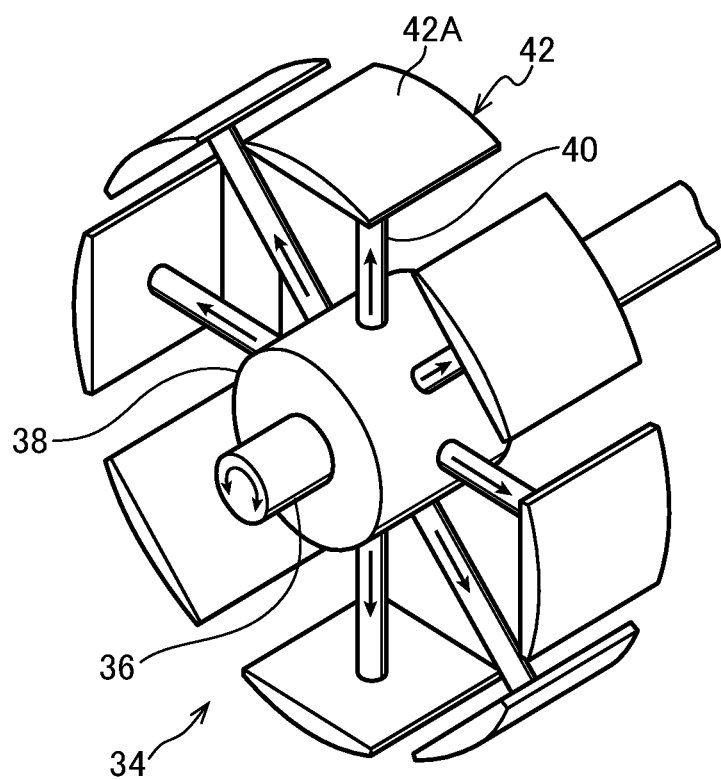
FIG. 3B is a perspective view of a tire supporting section of a tire building machine with cylinder rods in the maximum protruding amount state.

Tire support plates 42 are provided at the leading ends of the cylinder rods 40. Each of the tire support plates 42 has a circular arc shaped face 42A on the outside face provided with a radius of curvature substantially that of the tire case inner face. FIG. 3A illustrates the cylinder rods 40 in a state in which there is the minimum amount protruding, and FIG. 3B illustrates the cylinder rods 40 in a state in which there is the maximum amount protruding. The cylinder rods 40 are all coupled together enabling each to be moved by the same amount in the same direction.

Figure 4:
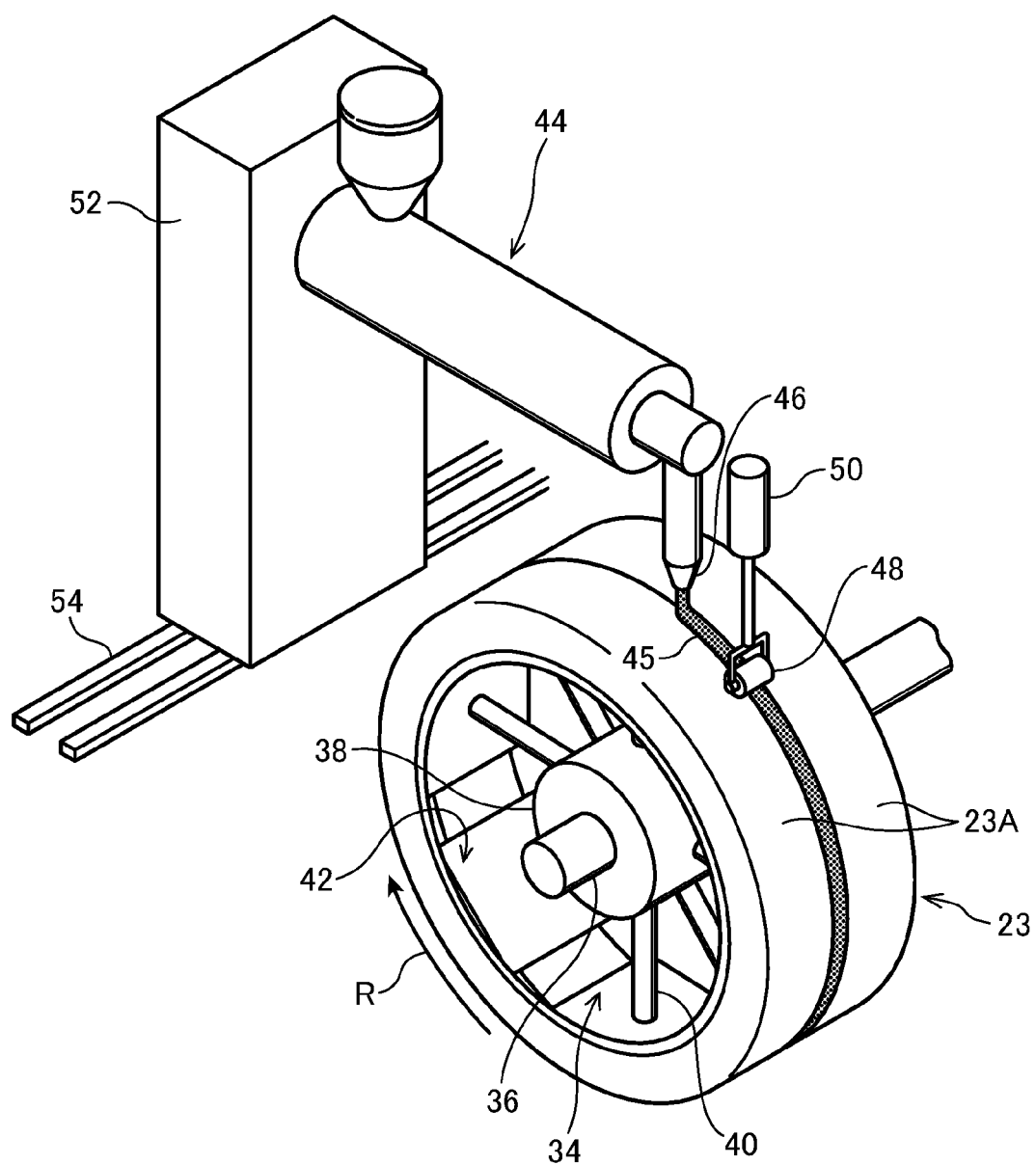
FIG. 4 is an explanatory diagram for explaining an operation when using an extruder to apply a welding thermoplastic material to a joint portion of case section bodies.

As shown in FIG. 4, an extruder 44 is disposed in the vicinity of the building machine 32 for extruding welding thermoplastic material when the tire case 23 is formed from plural sections in order to integrate together the section bodies (the tire case 23 of the present exemplary embodiment is formed by welding together and integrating case section bodies 23A split into left and right halves). The extruder 44 is equipped with a nozzle 46 for ejecting the molten welding thermoplastic material 45 downwards. The welding thermoplastic material 45 is preferably the same type of material as the thermoplastic material forming the tire case 23, however a different type of material may be employed as long as welding can be achieved. In the present exemplary embodiment the thermoplastic material forming the tire case 23 and the welding thermoplastic material 45 are the same type of material.

A flatting roller 48 to press against the welding thermoplastic material 45 applied to the case section bodies 23A of the tire case 23, and a cylinder device 50 for moving the flatting roller 48 up or down are disposed in the vicinity of the nozzle 46. The cylinder device 50 is supported through a frame, not shown in the drawings, by a support pillar 52 of the extruder 44. The extruder 44 is capable of moving along guide rails 54 disposed on the floor in a direction parallel to the shaft 36 of the building machine 32.

A cord feeder device 56 for feeding the reinforcement cord 26 to form the reinforcement cord layer 28 is movably mounted to the guide rails 54.

Figure 5:
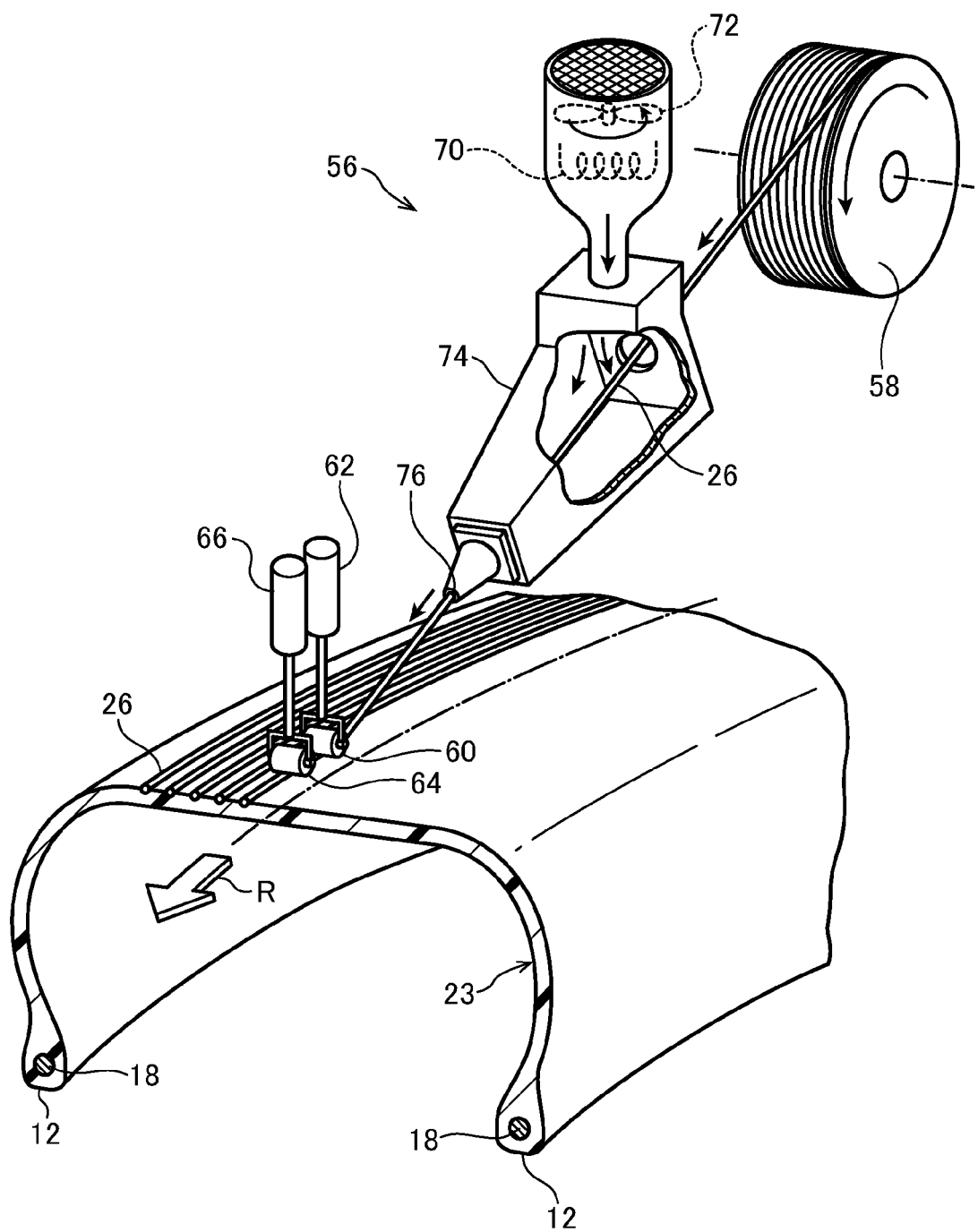
FIG. 5 is an explanatory diagram for explaining an operation to embed a reinforcement cord in a crown section of a tire case using a cord heating device and types of roller.

As shown in FIG. 5, the cord feeder device 56 is equipped with: a reel 58 wound with the reinforcement cord 26; a cord heating device 59 disposed at the downstream side of the reel 58 in the cord conveying direction; a press roller 60 disposed further to the downstream side in the reinforcement cord 26 conveying direction; a first cylinder device 62 for moving the press roller 60 in the direction so as to make contact with or move away from the outer peripheral face of the crown section 16 of the tire case 23; a cooling roller 64 disposed at the reinforcement cord 26 downstream side of the press roller 60; and a second cylinder device 66 for moving the metal fabricated cooling roller 64 in the direction so as to make contact with or move away from the outer peripheral face of the crown section 16. The surfaces of the press roller 60 and the cooling roller 64 are coated with a fluoro resin (Teflon (registered trademark) in the present exemplary embodiment) to suppress molten or softened thermoplastic material from adhering.

In the present exemplary embodiment the cord supply device 56 is configured with two rollers, the press roller 60 and the cooling roller 64, however the present invention is not limited to such a configuration and configuration may be made with only one thereof (namely with a single roller).

The cord heating device 59 is equipped with a heater 70 and a fan 72 for generating hot air and a heating box 74 with an internal space supplied with the hot air, with reinforcement cord 26 passing through the internal space of the heating box 74, and a discharge outlet 76 provided at the leading end of the heating box 74 from which the heated reinforcement cord 26 is discharged.

The cord supply device 56 is capable of movement along the rotational axis direction of the tire case 23.

Explanation follows regarding the manufacturing method of the tire 10 of the present exemplary embodiment.

Figure 6:
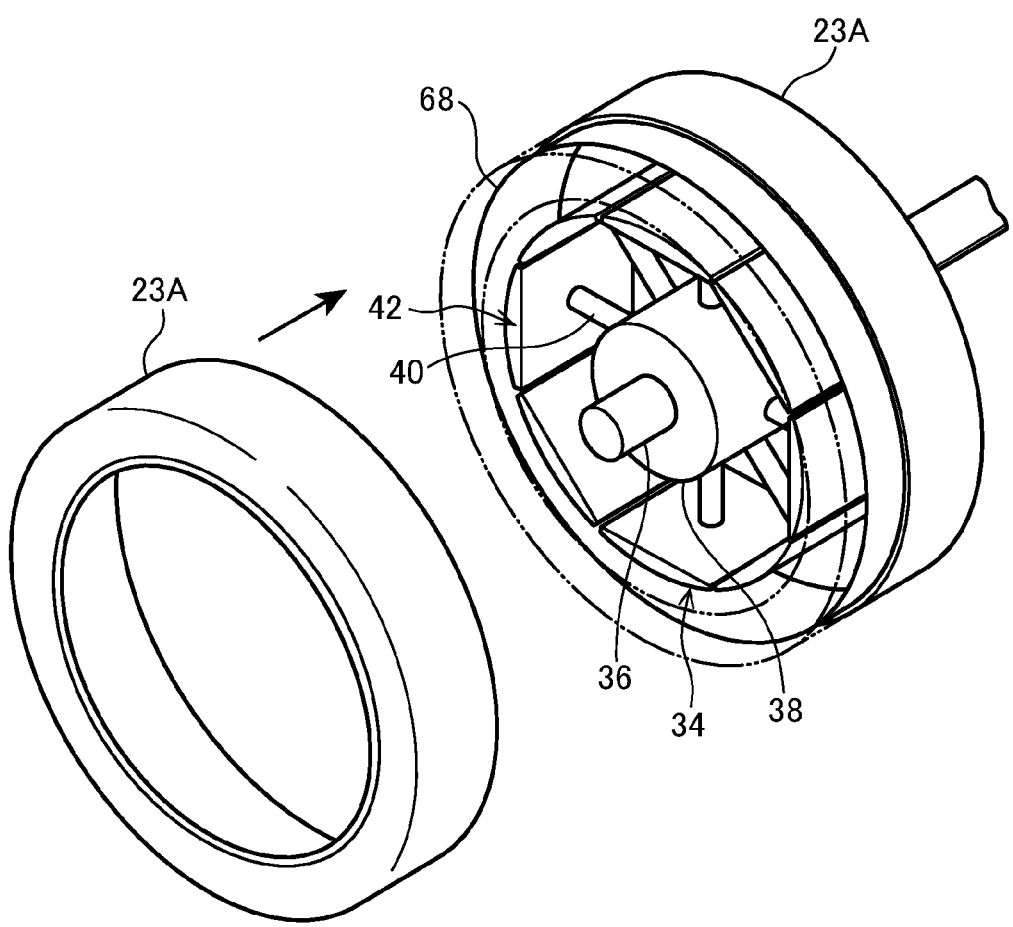
FIG. 6 is an explanatory diagram for explaining an operation to set case section bodies in a tire supporting section in a tire building machine.

Tire Case Building Process (1) As shown in FIG. 6, first the two case section bodies 23A are disposed at the outer peripheral side of the tire supporting section 34 in its compressed diameter state, aligned facing each other and abutting, and with a cylindrical shaped tire inner face support ring 68 formed from thin sheet metal (for example from sheet steel of 0.5 mm thickness) disposed at inside portions of the two case section bodies 23A. The external diameter of the tire inner face support ring 68 is set at substantially the same dimension as the inner diameter of the outer peripheral portion of the case section bodies 23A, such that the outer peripheral face of the tire inner face support ring 68 is in close contact with the inner peripheral face of the outer peripheral section of the case section bodies 23A. Accordingly, projections and indentations in the joint portion (the welding thermoplastic material 45), caused by (and in a reciprocal profile to) indentations and projections occurring at the outer periphery of the tire supporting section 34 due to gaps arising between tire support plates 42, can be suppressed from occurring. Indentations and projections can also be suppressed from arising due to gaps between the tire support plates 42 in laying-up materials (the tire case 23, the tread 30, and other tire building materials (such as, for example, a belt reinforcement layer)). Namely, indentations and projections can be suppressed from arising in the laying-up materials at locations corresponding to gaps between the tire support plates 42 due to forces acting (such as tension and pressing forces) when laying up the laying-up materials.

The tire inner face support ring 68 is easily insertable inside the case section bodies 23A by bending deformation due to being formed from thin sheet metal. Then the tire supporting section 34 is expanded in diameter to make the plural tire support plates 42 contact the inner peripheral face of the tire inner face support ring 68, such that the inside of the tire inner face support ring 68 is held by the plural tire support plates 42.

(2) Next the extruder 44 is moved such that, as shown in FIG. 4, the nozzle 46 is disposed above the abutting portions of the case section bodies 23A. Then, while rotating the tire supporting section 34 in the direction of arrow R, the melted welding thermoplastic material 45 is extruded out from the nozzle 46 towards the joining location, applying the melted welding thermoplastic material 45 along the joining location. The applied welding thermoplastic material 45 is then flattened uniformly by the flatting roller 48 disposed at the downstream side, welding together the outer peripheral faces of both the case section bodies 23A. The welding thermoplastic material 45 hardens on unforced cooling, one of the case section bodies 23A and the other of the case section bodies 23A are welded by the welding thermoplastic material 45, integrating these members together and forming the tire case 23.

Cord Member Winding Process (3) Then, as shown in FIG. 5, the extruder 44 is retracted and the cord feeder device 56 is disposed in the vicinity of the tire supporting section 34. The temperature of the heater 70 is then raised, and heated air at the periphery of the heater 70 is fed to the heating box 74 by moving air generated by rotating the fan 72. The reinforcement cord 26 wound out from the reel 58 is fed into and heated in the heating box 74 whose internal space is heated by the hot air (for example, the temperature of the reinforcement cord 26 is heated to about 100 to 200° C.). The heated reinforcement cord 26 passes through the discharge outlet 76 and is wound in a spiral shape at a constant tension on the outer peripheral face of the crown section 16 of the tire case 23 that is being rotated in the arrow R direction. When the heated reinforcement cord 26 makes contact with the outer peripheral face of the crown section 16, the contacting portions of the thermoplastic material are melted or softened, and at least a portion of the heated reinforcement cord 26 is embedded in the outer peripheral face of the crown section 16. When this occurs, due to the heated reinforcement cord 26 becoming embedded in the melted or softened thermoplastic material, a state is achieved in which there is no gap between the thermoplastic material and the reinforcement cord 26, namely a state of close contact. Accordingly air is suppressed from being incorporated in the portion where the reinforcement cord 26 is embedded. Heating the reinforcement cord 26 to a higher temperature than the melting point of the thermoplastic material of the tire case 23 promotes melting or softening of the thermoplastic material at the portions making contact with the reinforcement cord 26. Accordingly embedding of the reinforcement cord 26 into the outer peripheral face of the crown section 16 is facilitated, and the air can be efficiently suppressed from being incorporated.

The tension applied to the reinforcement cord 26 is also regulated by applying braking to the reel 58 performing rotation following rotation of the tire case 23, and by winding the reinforcement cord 26 while applying a constant tension in this manner the reinforcement cord 26 can be suppressed from snaking, and the embedded amount of the reinforcement cord 26 can also be regulated. In the present exemplary embodiment tension is regulated by applying braking to the reel 58, however configuration may be made such that the tension is regulated by, for example, providing a tension regulation roller in the conveying path of the reinforcement cord 26.

Directly after at least a portion of the heated reinforcement cord 26 has been embedded in the outer peripheral face of the crown section 16, the reinforcement cord 26 is embedded deeply by being pressed by the press roller 60. As this is performed the periphery of the embedded portions is flattened by the press roller 60 and any air incorporated during embedding the reinforcement cord 26 is squeezed out. The press roller 60 is configured so as to perform rotation following rotation of the tire case 23.

Then by pressing the outer peripheral face of the crown section 16 with the cooling roller 64 provided on the downstream side of the press roller 60, and the portions of the thermoplastic material that were melted or softened by the heated reinforcement cord 26 are force cooled. Since the thermoplastic material at the portions where the reinforcement cord 26 is embedded is thereby cooled before the reinforcement cord 26 moves, the reinforcement cord 26 can be laid down with good precision, and deformation of the thermoplastic material at the portions where the reinforcement cord 26 is embedded can be suppressed. The cooling roller 64 is configured so as to rotate following rotation of the tire case 23.

The embedded amount L of the reinforcement cord 26 can be regulated by such means as the heated temperature of the reinforcement cord 26, the tension applied to the reinforcement cord 26 and the pressing force from the press roller 60. In the present exemplary embodiment the embedded amount L of the reinforcement cord 26 is set so as to be $1/5$ or more of the diameter D of the reinforcement cord 26. The embedded amount L of the reinforcement cord 26 is more preferably more than $1/2$ the diameter D, and most preferably the whole of the reinforcement cord 26 is embedded.

Accordingly, by winding the heated reinforcement cord 26 while embedding the reinforcement cord 26 in the outer peripheral face of the crown section 16, the reinforcement cord layer 28 is formed at the outer peripheral side of the crown section 16 of the tire case 23.

(4) The pre-vulcanized strip shaped tread 30 is then wound once around the outer peripheral face of the tire case 23 and the tread 30 is bonded to the outer peripheral face of the tire case 23 using, for example, an adhesive. A known pre-cured tread used in recycled tires can, for example, be employed for the tread 30. This process is similar to the process of bonding a pre-cured tread to the outer peripheral face of a tire base in recycled tire manufacturing.

(5) Bonding the seal layer 24, formed from a material that is softer than the thermoplastic material, to the bead sections 12 of the tire case 23 such as with an adhesive thus completes the tire 10.

(6) Finally the diameter of the tire supporting section 34 is shrunk, the completed tire 10 is removed from the tire supporting section 34 and the tire inner face support ring 68 is removed from inside the tire by bending deformation.

Operation

In the tire 10 of the present exemplary embodiment the reinforcement cord 26 of higher rigidity to that of the thermoplastic material is wound in the circumferential direction in a spiral shape on the outer peripheral face of the crown section 16 of the tire case 23 formed from the thermoplastic material, raising characteristics such as the resistance to punctures, cut resistance and the circumferential direction rigidity of the tire 10. By raising the circumferential direction rigidity of the tire 10 creep of the tire case 23 formed from the thermoplastic material is prevented.

In cross-section viewed along the axial direction of the tire case 23 (the cross-section illustrated in FIG. 1), at least a portion of the reinforcement cord 26 is embedded in the outer peripheral face of the crown section 16 of the tire case 23 formed from the thermoplastic material, and is in close contact with the thermoplastic material. Accordingly, air incorporation during manufacture is suppressed, and the reinforcement cord 26 is suppressed from moving during running Delamination of the reinforcement cord 26, the tire case 23 and the tread 30 is accordingly also suppressed from occurring, raising the durability of the tire 10.

Figure 2:
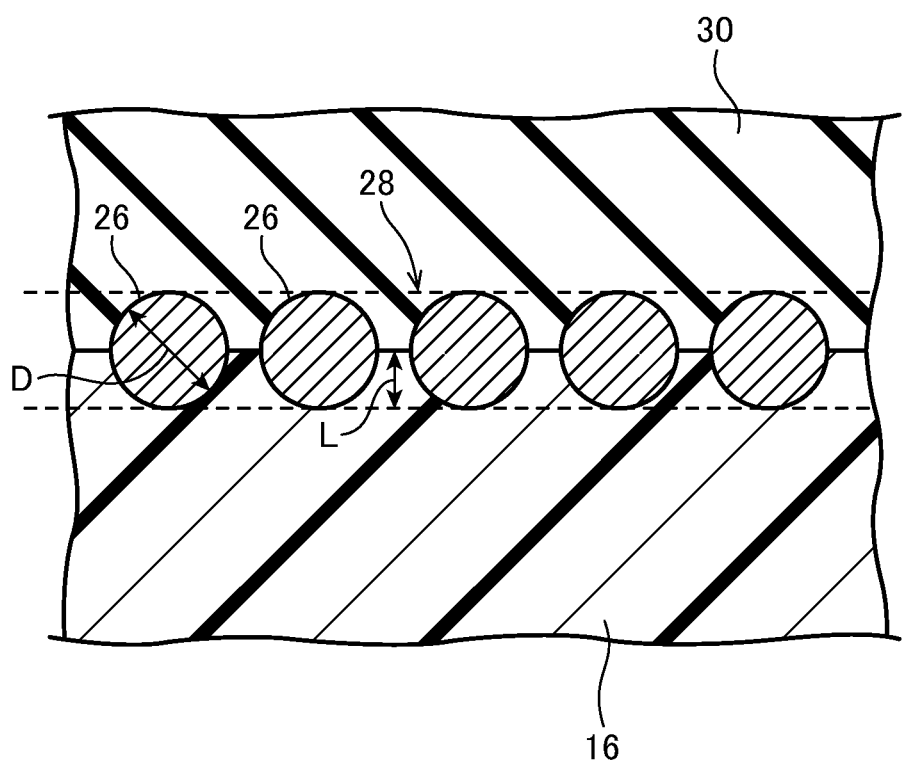
FIG. 2 is a cross-section along a tire rotation axis illustrating a reinforcement cord in an embedded state in a crown section of a tire case of a tire of the first exemplary embodiment.

As shown in FIG. 2, since the embedded amount L of the reinforcement cord 26 is ⅕ or more of its diameter D, air incorporation during manufacture is efficiently suppressed, further suppressing movement of the reinforcement cord 26 due to force input during running, for example.

Furthermore, the rigidity is raised to internal pressure from the tire radial direction inside due to the reinforcement cord 26 being wound in a spiral shape on the crown section 16 of the tire case 23.

The abrasion resistance of the tire 10 is raised due to the tread 30 that contacts the road surface being formed from a rubber material with higher resistance to abrasion than the thermoplastic material.

Furthermore, due to the ring shaped bead cores 18 formed from a metal material being embedded in the bead sections 12, the tire case 23, namely the tire 10, is retained on the rim 20 with a similar robustness to that of a conventional rubber pneumatic tire.

The seal layer 24 formed from a material that is softer than the thermoplastic material is provided to portions of the bead sections 12 making contact with the rim 20. The material configuring the seal layer 24 is softer than the thermoplastic material configuring the tire case 23, namely the air tightness between the tire 10 and the rim 20 is raised due to resilient reaction force. Air is accordingly suppressed from leaking out from inside the tire better than in cases in which sealing is between the rim 20 and the thermoplastic resin. Rim fit-ability is also raised by providing the seal layer 24.

According to the structure of the tire 10 of the present exemplary embodiment, the tire case 23 formed from the resin material provides rigidity without using carcass plies widely employed in conventional rubber tires, and so a reduction in weight can be achieved compared with conventional rubber tires provided with carcass plies. With the structure of the tire 10 of the present exemplary embodiment the number of treatment processes during tire manufacture can also be reduced due to not using carcass plies like those in conventional rubber tires.

Other Exemplary Embodiments

Figure 7:
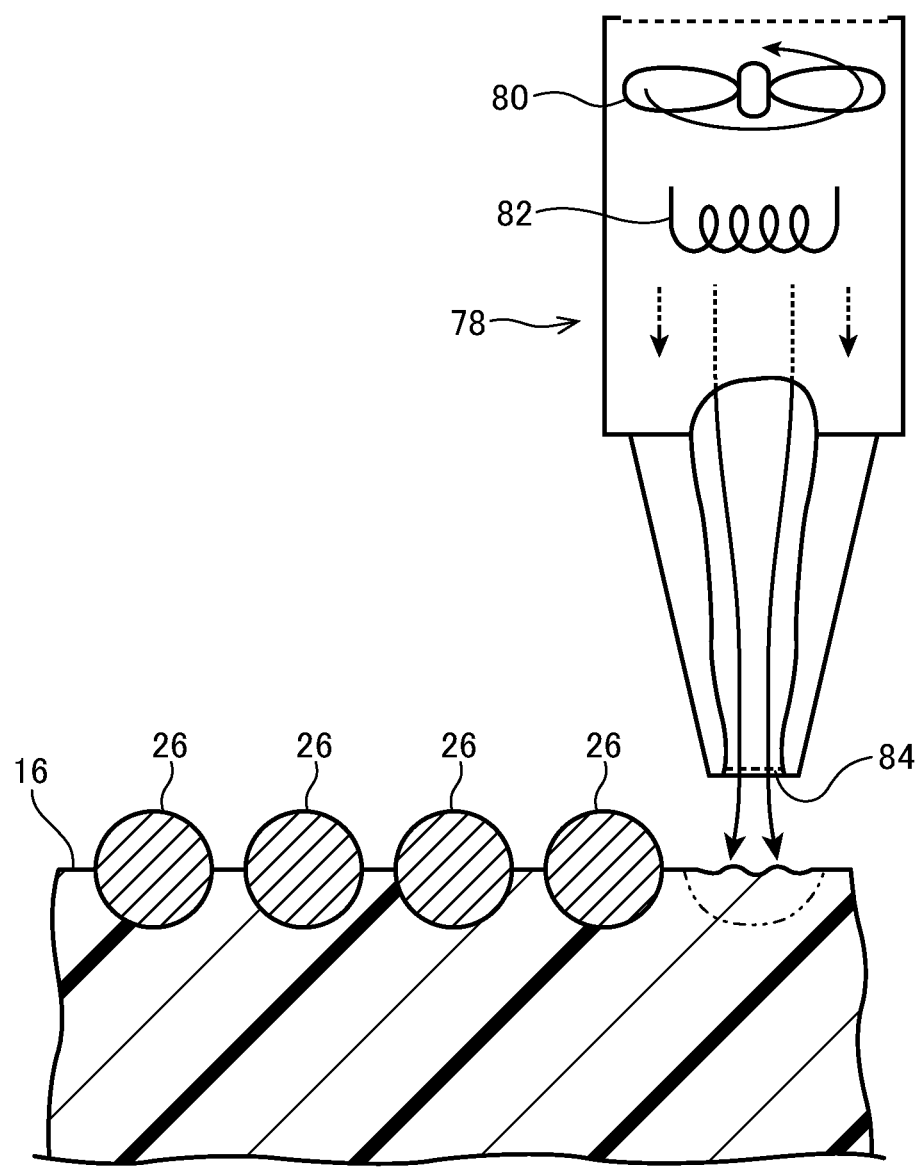
FIG. 7 is an explanatory diagram for explaining an operation to heat a portion where a reinforcement cord is to be embedded with a hot air device according to a tire manufacturing method of another exemplary embodiment.

The above exemplary embodiment is configured such that the reinforcement cord 26 is heated, and the portions of the thermoplastic material making contact with the heated reinforcement cord 26 are melted or softened, however the present invention is not limited to such a configuration. Configuration may be made in which the reinforcement cord 26 is not heated, and, as shown in FIG. 7, a hot air generator 78 with a fan 82, a heater 80 and a discharge outlet 84 is employed. The hot air generated by the hot air generator 78 is blown onto the portions where the reinforcement cord 26 is to embedded, and the reinforcement cord 26 is embedded and placed in close contact after the thermoplastic material has been melted or softened. The cord heating device 59 and the hot air generator 78 may be employed together. When both are employed together embedding of the reinforcement cord 26 in the thermoplastic material and attaining close contact can be achieved with greater certainty than when only one or other of the former or later device is employed.

In the above exemplary embodiment the heater 70 and the fan 72 are employed as the heat source of the cord heating device 59, however the present invention is not limited to such a configuration. A configuration may be adopted with a radiant heater (such as an infrared heater) employed to directly heat the reinforcement cord 26. The heater 80 and the fan 82 are employed as the heat source of the hot air generator 78, however the present invention is not limited to such a configuration. For example, infrared radiation may be focused onto the portion where the reinforcement cord 26 is to be embedded, melting or softening the embedding portion.

The above exemplary embodiment is configured such that the melted or softened portions of the thermoplastic material where the reinforcement cord 26 is embedded are force cooled with the metal fabricated cooling roller 64, however the present invention is not limited to such a configuration. Configuration may be made in which cooling air is blown directly onto the melted or softened portions of the thermoplastic material, force cooling and solidifying the melted or softened portions of the thermoplastic material.

The above exemplary embodiment is a configuration in which the reinforcement cord 26 is heated, however, for example, configuration may be made with a covering of thermoplastic material the same as the tire case 23 on the outside periphery of the reinforcement cord 26. In such cases air can be efficiently suppressed from being incorporated during embedding in the crown section 16 by heating the thermoplastic material covering together with the reinforcement cord 26 when winding the covered reinforcement cord onto the crown section 16 of the tire case 23.

The above exemplary embodiment is a configuration in which the plural case section bodies 23A are welded together to form the tire case 23, and the reinforcement cord layer 28 is formed by winding the reinforcement cord 26 on the crown section 16 of the tire case 23, however the present invention is not limited to such a configuration. For example, the tire case 23 can be integrally formed by holding the reinforcement cord 26 in a wound state inside a mold, then injecting a resin material in a melted or softened state into the mold (for example injecting a thermoset material (such as a thermoplastic resin) or thermoplastic material). An example of such a configuration is explained below.

The above mold is configured so as to be split into plural sections, and a groove is formed in a spiral shape on the inner peripheral face corresponding to the crown section 16 (outer peripheral section) of the tire case 23. The groove is such that the reinforcement cord 26 fits therein. The above reinforcement cord is retained (fitted) into the groove in the mold, resin material in a melted or softened state is injected into the mold, and the tire case 23 configured by the resin material is integrally formed by letting the injected resin material cool and harden (hardening either by unforced cooling or forced cooling). Accordingly, at least a portion of the reinforcement cord 26 is embedded in the crown section 16 of the tire case 23 when viewed in cross-section along the tire case 23 axial direction (the cross-section illustrated in FIG. 1). Air is suppressed from being incorporated during manufacturing due to the portion of the reinforcement cord 26 embedded in the crown section 16 being in close contact with the resin material configuring the tire case 23, and the reinforcement cord 26 is accordingly suppressed from moving due to force input during running. Accordingly delamination of the reinforcement cord 26, the tire case 23 and the tread 30 is suppressed from occurring, and the durability of the tire 10 is raised. The reinforcement cord 26 may be adhered to the inner periphery of the mold as a method for retaining the reinforcement cord 26 at the inner periphery of the mold, or another method may be selected.

Figure 8:
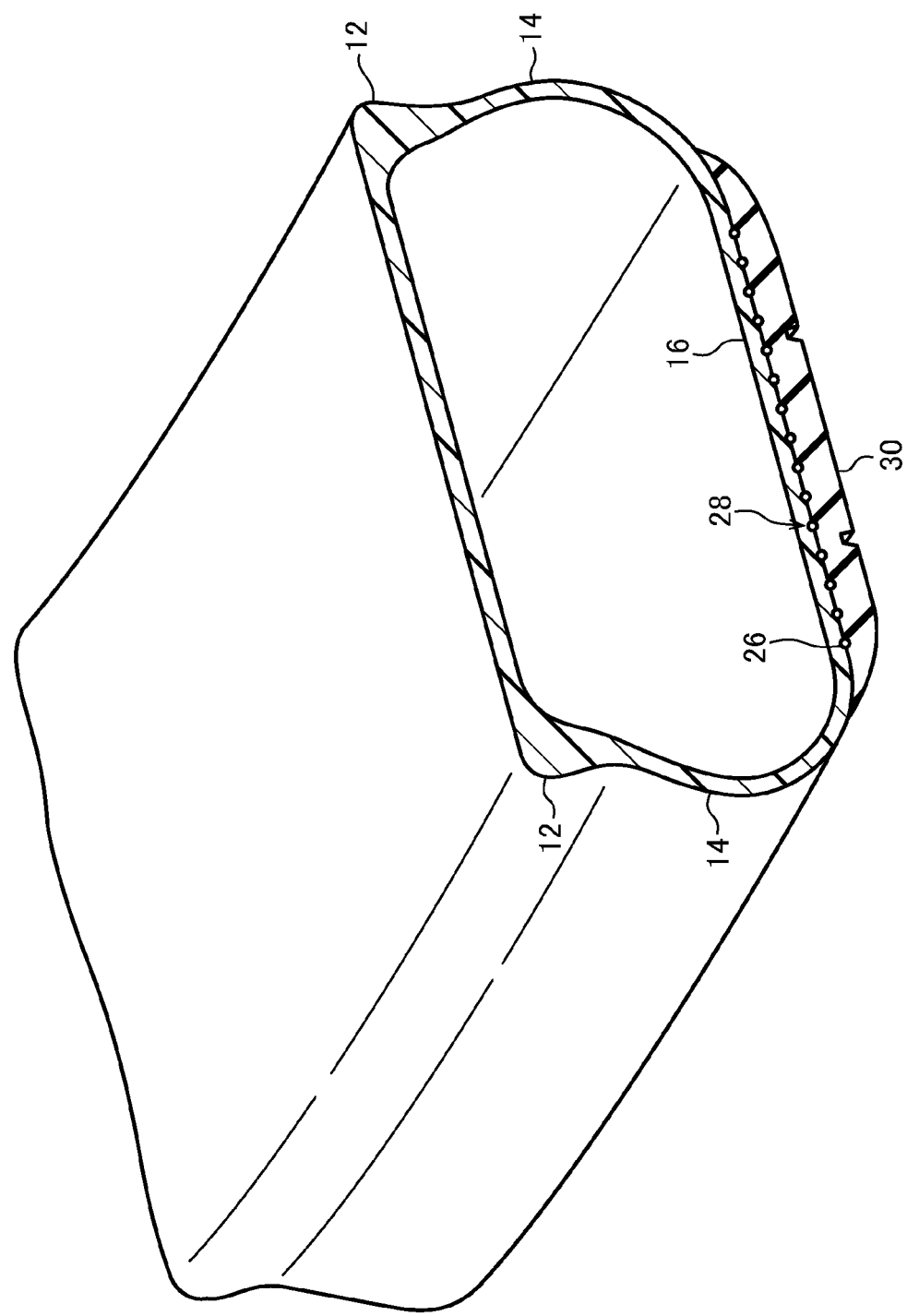
FIG. 8 is a cross-section illustrating a cross-section along a tire rotation axis of a tubed tire of another exemplary embodiment.

In the tire 10 of the above exemplary embodiment the bead sections 12 are mounted to the rim 20, and an air chamber is formed between the tire 10 and the rim 20 in what is referred to as a tubeless tire, however the present invention is not limited to such a configuration, and, as shown in FIG. 8, application may be made to a complete tube profile.

Spirally winding the reinforcement cord 26 facilitates manufacturing, however other methods may be considered, such as methods employing reinforcement cords 26 that are not continuous across the width direction.

Embodiments of the present invention have been explained with exemplary embodiments given, however these are merely examples of embodiments, and various modifications can be implemented within a scope not departing from the spirit of the present invention. Obviously the scope of rights of the present invention is also not limited by these exemplary embodiments.

The invention claimed is:

1. A tire for rim mounting comprising a ring shaped tire frame body formed from a resin material having thermoplastic properties, the tire further comprising:
   a reinforcement cord member wound around an outer peripheral section of the tire frame body to form a reinforcement cord layer, when viewed in a cross-section along the axial direction of the tire frame body, having a portion of the reinforcement cord member embedded in the outer peripheral section of the tire frame body; and
   a tread provided at the radial direction outside of the reinforcement cord layer and formed from a rubber,
   wherein the reinforcement cord member comprises embedded portions and non-embedded portions,
   wherein the reinforcement cord member is in a state of close contact with the resin material throughout the embedded portions, and the non-embedded portions are bonded to the tread,
   wherein the reinforcement cord member is in tension, and
   wherein, viewed in a cross-section along the axial direction of the tire frame body, the reinforcement cord member is embedded in the outer peripheral section of the tire frame body by greater than ½ of the diameter of the reinforcement cord member.

2. The tire of claim 1, wherein the tire frame body comprises, at the radial direction inside, a bead section that makes contact with a bead seat and a rim flange of the rim, and a ring shaped bead core made from a metal material embedded in the bead section.

3. The tire of claim 2, further comprising a seal portion that is provided to a portion of the bead section making contact with the rim and is formed from a material that is softer than the resin material.

4. The tire of claim 1, wherein the reinforcement cord member includes a covering of a thermoplastic material which is the same as the resin material forming the tire frame body.

* * * * *